June 30, 1931.  A. O. HURXTHAL  1,812,788
THERMOSTATIC ELEMENT
Filed Feb. 24, 1928
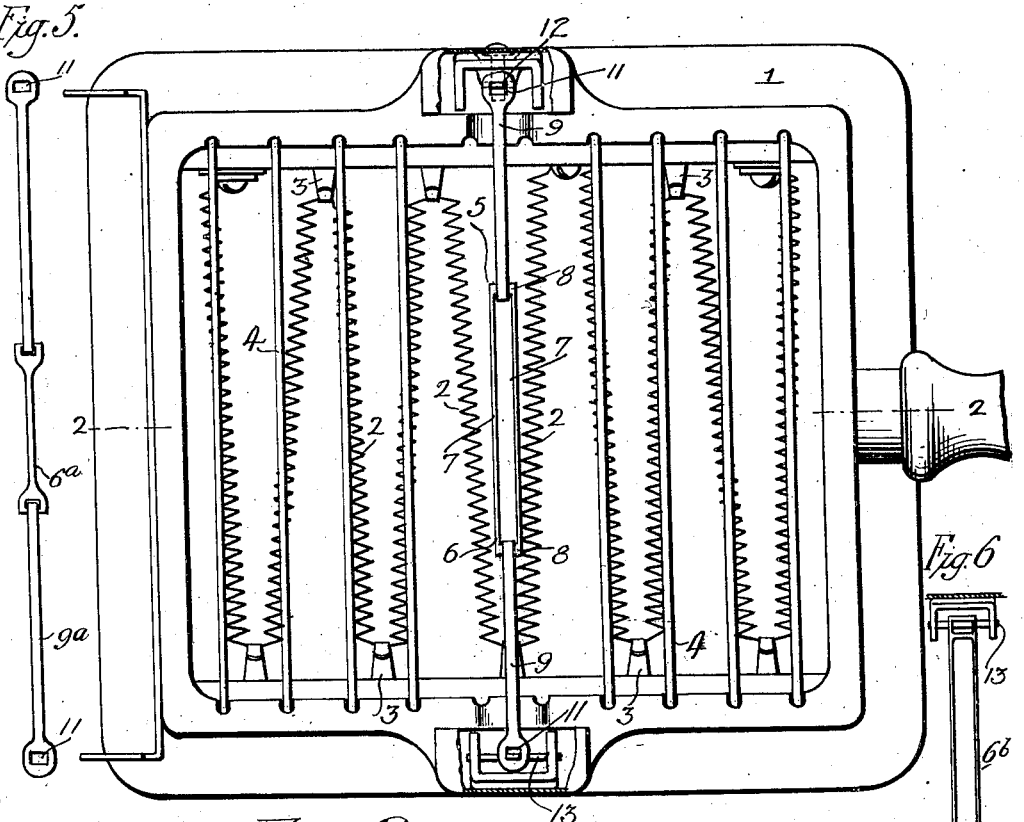
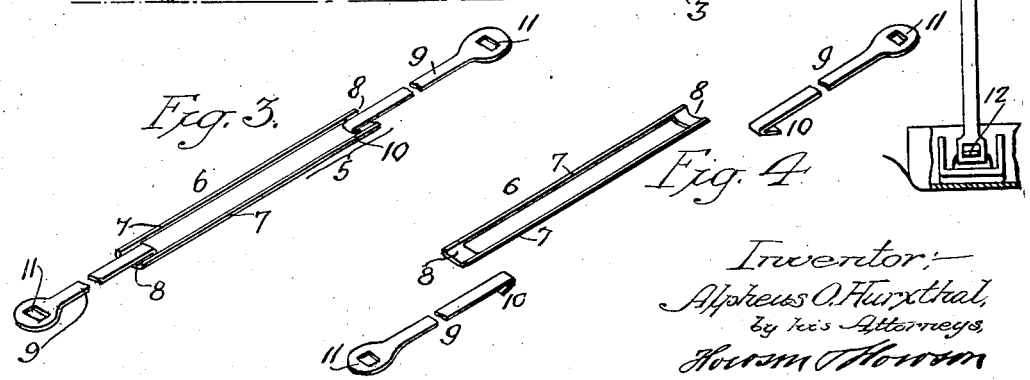
Inventor:—
Alpheus O. Hurxthal,
by his Attorneys, Patented June 30, 1931

1,812,788

UNITED STATES PATENT OFFICE

ALPHEUS O. HURXTHAL, OF PHILADELPHIA, PENNSYLVANIA, ASSIGNOR TO PROCTOR & SCHWARTZ, INCORPORATED, OF PHILADELPHIA, PENNSYLVANIA, A CORPORATION OF PENNSYLVANIA

THERMOSTATIC ELEMENT

Application filed February 24, 1928. Serial No. 256,648.

This invention relates to certain improvements in thermostatic elements used on automatic toasters and like cooking devices.

The object of my invention is to provide a thermostatic element, adapted to extend across a toaster or like cooking utensil, which is made in sections, the central expansive section being comparatively short, so that material being toasted will cover the entire expansive section, insuring the proper toasting of the slice of bread.

Where the expansive element is longer than the bread is wide, then that portion of the expansive element not covered by the bread heats up more quickly than the other portion, and, consequently, will actuate the automatic switch before the bread has been thoroughly toasted.

In the accompanying drawings:

Figure 1 is a plan view of a toaster illustrating my invention, the upper section of the toaster being detached;

Fig. 2 is a sectional view on the line 2—2 of Fig. 1;

Fig. 3 is a perspective view of the thermostatic element;

Fig. 4 is a detached perspective view of the thermostatic element; and

Figs. 5 and 6 are views illustrating modifications of the invention.

In the drawings, 1 is the frame of the toaster which may be of any form desired.

Heating elements 2 are mounted on hooks 3 in the present instance, projecting from the sides of the frame 1. These heating elements are connected to the terminals leading from the sockets which receive the plugs of the ordinary type.

Located above the heating elements 2 in the present instance are cross-bars 4 which are spaced a given distance apart and which support the bread to be toasted.

Extending from one side of the toaster to the other is the thermostatic element 5, which is made in three sections in the present instance, as shown in Fig. 3.

The central section 6 is the expansive section and consists of two longitudinal bars 7—7 connected by a cross-piece 8 at each end, and end members 9 which have hooks 10. These hooks engage the cross-bars 8 of the central member 6. The end members are perforated at 11 to engage the adjusting means 12 at one end and the connection 13, which actuates the trip mechanism of the toaster.

This invention is an improvement upon the thermostatic element described in the patent granted to me on the 2nd day of June, 1925, No. 1,540,628, thereby making it unnecessary to describe, in detail, the mechanism which actuates the alarm and shuts off the current.

The central section of the thermostatic element is made of a high expansive metal, while the end pieces 9—9 are made of low expansive metal or other material. If made of metal, such material as nickel steel may be used.

It will be noticed that the central expansive section 6 of the thermostatic element is much less in length than the width of the toaster. A small slice of bread will cover the entire expansive element, insuring the proper toasting of the bread, regardless of whether it is small or large.

In Fig. 5, I have illustrated a modification, in which the element 6a is in the shape of a single bar and is much shorter than the central element in Fig. 1.

In Fig. 6, I have illustrated a modification, showing the thermostatic element made in two sections 6b and 9b. In this instance the bread to be toasted would be placed over the high expansive section of the element at one side of the toaster.

It will be understood that the expansive element may be of any length and of any shape, providing it is of such length that a comparatively small piece of toast or other material to be toasted or cooked will cover said expansive section.

I claim:

1. A thermostatic element for a cooking device made in three sections, the central section being less in length than the width of the cooking device and being of a high expansive metal, the end sections by which the thermostatic element is attached to the mechanism of the cooking utensil being of a low expansive material.

2. A thermostatic element made in three sections, the central section being of a high expansive material and consisting of two parallel bars connected together at each end; and low expansive sections attached to the cross-bars and arranged to be attached to the mechanism which is actuated by the thermostatic element.

3. The combination in a thermostatic element made in sections, the central section being of a high expansive metal and consisting of two parallel bars and a cross-bar at each end connecting the parallel bars; and low expansive sections having hooks which engage the cross-bars of the high expansive central section, and having means by which they are attached to the mechanism to be controlled by the thermostatic element.

4. A thermostatic element adapted to extend across a heating area of a cooking device, the said element comprising a plurality of sections, one of which is composed of high expansive material and is of lesser length than the width of that portion of the heating area across which the thermostatic element extends, the remainder of the thermostatic element being composed of low expansive material.

ALPHEUS O. HURXTHAL.